United States Patent
Badar et al.

(10) Patent No.: US 11,632,658 B1
(45) Date of Patent: Apr. 18, 2023

(54) TELEPHONY APPLICATION SERVER CHARGING FOR EVOLVED PACKET SYSTEM FALLBACK

(71) Applicant: T-Mobile USA, Inc., Bellevue, WA (US)

(72) Inventors: Saqib Badar, Bellevue, WA (US); Shujaur Rehman Mufti, Snoqualmie, WA (US); Nassereddine Sabeur, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/370,532

(22) Filed: Jul. 8, 2021

(51) Int. Cl.
*H04W 4/00* (2018.01)
*H04W 4/24* (2018.01)
*H04W 36/14* (2009.01)
*H04M 15/00* (2006.01)

(52) U.S. Cl.
CPC ............ *H04W 4/24* (2013.01); *H04M 15/50* (2013.01); *H04M 15/55* (2013.01); *H04W 36/14* (2013.01); *H04M 15/41* (2013.01)

(58) Field of Classification Search
CPC . H04W 36/0022; H04W 28/10; H04W 28/08; H04W 8/082; H04W 48/18; H04W 36/06
See application file for complete search history.

(56) References Cited

U.S. PATENT DOCUMENTS

| | | | |
|---|---|---|---|
| 2019/0335534 A1* | 10/2019 | Atarius | H04M 15/66 |
| 2022/0124869 A1* | 4/2022 | Keller | H04W 36/0022 |
| 2022/0360975 A1* | 11/2022 | Oh | H04W 8/24 |

FOREIGN PATENT DOCUMENTS

WO WO-2022066253 A1 * 3/2022

* cited by examiner

*Primary Examiner* — Pakee Fang
(74) *Attorney, Agent, or Firm* — Lee & Hayes, P.C.

(57) ABSTRACT

A server of a fifth generation (5G) network can provide substantially real-time charges for a UE during fallback to another network. A Telephony Application Server (TAS) in an IP Multimedia Subsystem (IMS) can identify Evolved Packet System Fallback (EPSFB) and report the EPSFB to a charging system to cause the charging system to generate accurate charges for user equipment communicating over the 5G network and the other network. The TAS can comprise logic to identify a change in P-Access-Network-Information associated with each network, and generate a call detail records for billing, or real-time communication via an online charging and/or offline charging for the served UE. Information (a user profile, call detail records, instance of EPSFB, etc.) associated with the TAS can be used to make network improvements that decrease instances of EPSFB and increase an amount of new radio services available to UEs.

14 Claims, 7 Drawing Sheets

500

Receive, by a server of a fifth generation telecommunications network, a message from a first user equipment (UE) indicating a request for communication with a second UE
502

Determine, by the server and based at least in part on an identifier of the first UE indicating a type of technology associated with the message, that the communication comprises Evolved Packet System Fallback (EPSFB) from the fifth generation telecommunications network to a second network different from the fifth generation telecommunications network
504

Send, by the server, information indicating the EPSFB to a charging system
506

Receive, by the server, a charge for the first UE associated with the communication to the second UE over the second network based at least in part on the information indicating the EPSFB sent to the charging system
508

FIG. 5

TELEPHONY APPLICATION SERVER CHARGING FOR EVOLVED PACKET SYSTEM FALLBACK

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 depicts a flowchart of an example process for determining charges by an example server for an example user equipment.

DETAILED DESCRIPTION

Figure 1:
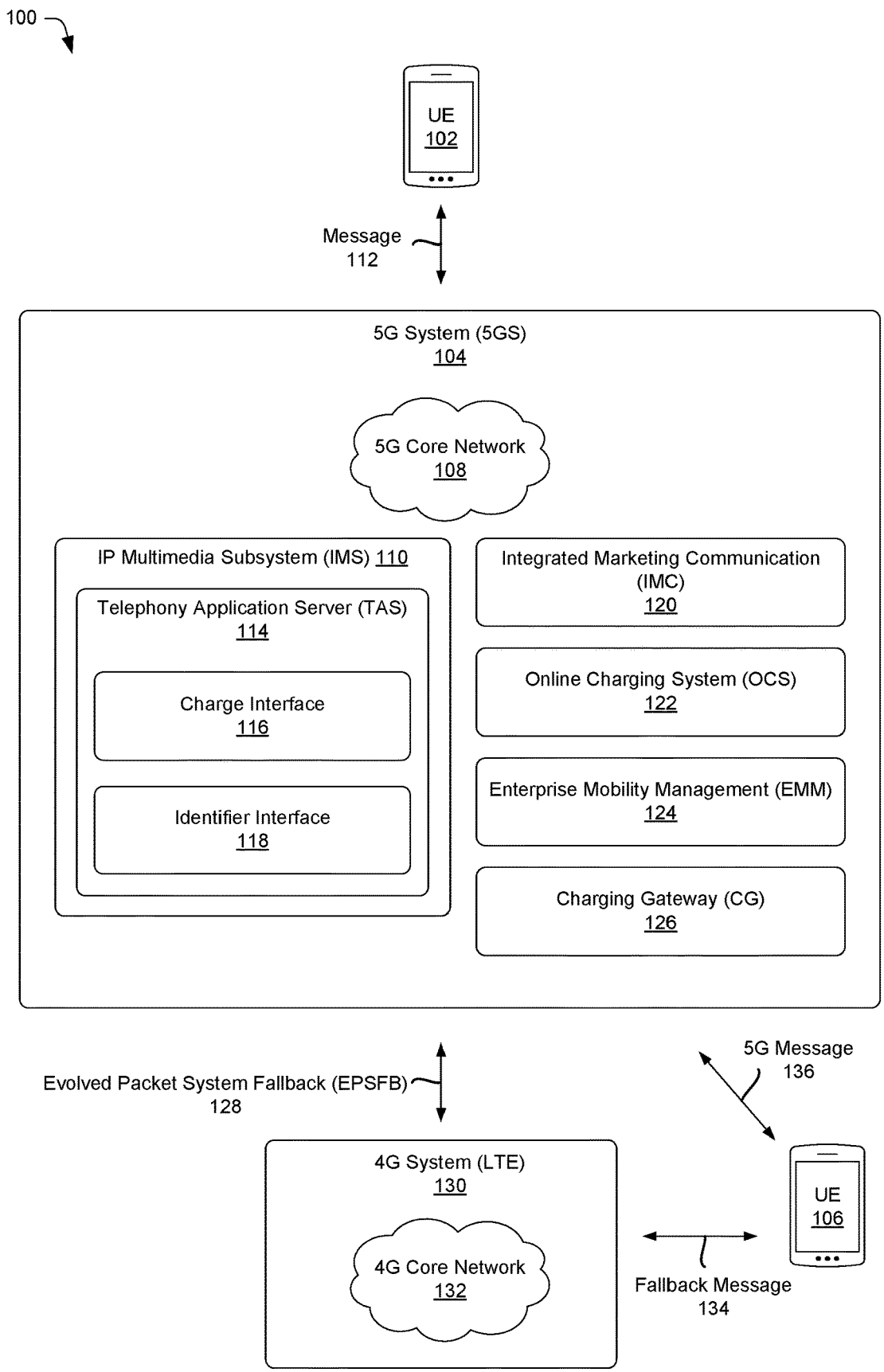
FIG. 1 depicts an example network environment in which an example user equipment can connect to a telecommunication network to implement the techniques described herein.

As devices compete for available bandwidth to receive Voice over New Radio (VoNR) and other services over a fifth generation (5G) network, fallback to one or more other networks may occur. This application describes techniques for determining charges during Evolved Packet System Fallback (EPSFB) over a 5G network. For example, charge detail records (CDR) are established by a telephony application server (TAS) based on an identifier associated with a user equipment (UE) that indicates a type of technology associated with a communication request. In some examples, the TAS can facilitate determinations of real-time charges for services provided by New Radio (NR), Long Term Evolution (LTE), and so on during EPSFB by tracking changes in P-Access-Network-Information (PANI) associated with the UE. In this way, the TAS can determine real-time changes in technology type to initiate or access charges for each portion of a communication over various technology types. In some examples, the TAS can identify a change in technology type (e.g., 5G, LTE, etc.) and communicate the changes to a charging system that determines charges using logic that accounts for each change during the communication. In addition to improving accuracy of charges during fallback, the TAS can also output records usable to identify areas of the 5G network that can be improved to reduce fallback for future communications.

In various examples, the TAS can comprise logic to identify a change in P-Access-Network-Information associated with each network and generate call detail records for usable to determine an online charge and/or an offline charge for the UE. Using the techniques described herein, the TAS can initiate, establish, maintain, manage, or otherwise determine changes in technology that can be communicated to a charging system that determines online charges and/or offline charges for a communication originating with a first UE to a second UE. In some examples, the charges may be associated with call detail records, an offline charge, and/or an online charge. By way of example and not limitation, the TAS can facilitate the determination of charge(s) for a Voice over New Radio (VoNR), a Video over New Radio (ViNR), a Voice over LTE (VoLTE), and/or a Video over LTE (ViLTE), just to name a few. In such examples, the TAS can cause the charging system to implement rating logic that accurately determines charges for portions of a communication (e.g., a text, voice, video, and/or other call) occurring over different types of network technologies.

In some examples, the TAS can receive a message from a first UE indicating a request for a VoNR communication with a second UE and identify that EPSFB requires the communication to fallback to another network, such as a fourth generation network. The TAS can, for example, determine a change in identifiers associated with the networks such as by accessing P-Access-Network-Information (PANI) that identifies a type of technology used by each network. In some examples, the PANI can identify an access-type and technology in a SIP header. The TAS may also or instead access or determine other types of SIP headers such as a SIP User-Agent header that identifies device type information about the UE. In various examples, the TAS can determine changes in technology and communicate the changes to various components, servers, and/or systems responsible for determining charges in substantially real-time including when the UE originating the communication is associated with a pre-paid device. Additional details for the TAS determining changes in technology that leads to determining appropriate charges can be found elsewhere including in FIG. 1.

The charging techniques described herein can enable a UE (e.g., an originating and/or a terminating device) to be charged for portions of a communication according to an amount of time that the communication uses different networks. That is, a message requesting a VoNR communication may instead be completed or communicated at least in part on an LTE network, and charges can be determined for a communication over the LTE network rather than for the VoNR communication indicated by the message request. Further, a pre-paid device without sufficient credit to complete a call using a VoNR communication can still be completed as another type of communication (e.g., VoLTE)

during EPSFB by another network using the techniques described herein (as opposed to being denied service on the 5G network that is otherwise unable to initiate the VoNR communication due to limited bandwidth, insufficient credit, etc.). Based at least in part on the TAS detecting a change in technology, the TAS can generate data indicating the changes in technology (along with a period of time associated with each technology in some examples) for communication to a charging system that can determine charges based on logic that identifies a period of time that a communication uses a particular network, including when the communication uses or otherwise returns to the 5G network to provide the VoNR communication.

In some examples, the TAS can provide information to another server or component of the 5G network indicating which area(s) of the 5G network experiences EPSFB to enable an improvement of the 5G network. For example, one or more call detail records output by the TAS can be used (by the TAS or other server) to generate information that identifies the area(s) of the network having instances of fallback. In such examples, the information can be sent to another component, machine learned model, and/or server of the 5G network that is configured to determine network parameters that maximize throughput of UEs in the corresponding area(s). In this way, the TAS can be used to provide visibility of fallback occurrences to mitigate the network settings, configurations, and the like and/or to identify where additional equipment can be deployed to improve the 5G network.

The systems and techniques disclosed herein may provide for processing an identifier associated with a UE to generate charges when initiating, maintaining, and terminating a communication with another UE, including during fallback to a network other than a 5G network. In some examples, the TAS may be part of an Internet Protocol (IP) Multimedia Subsystem (IMS) or other system in the 5G network. Further description of providing charging techniques by the TAS can be found throughout this disclosure including in the figures below.

FIG. 1 depicts an example network environment 100 in which an example user equipment (UE) can connect to a telecommunication network to engage in communication sessions for voice calls, video calls, messaging, data transfers, or other types of communications. For example, the UE 102 can connect to a 5G system 104 for sending a communication (e.g., a VoNR communication, a ViNR communication, etc.) to one or more additional UEs (e.g., UE 106).

As depicted in FIG. 1, the 5G system 104 comprises a 5G core network 108 and an IP Multimedia Subsystem (IMS) 110 (e.g., an IMS core network) that receives a message 112 from the UE 102. The IMS 110 is shown comprising a TAS 114 that is configured to identify, generate, communicate, or otherwise determine a change in technology usable by a charging system to determine charge(s) for the UE 102 to communicate with the UE 106. In some examples, the UE 102 can generate the message 112 that includes a connection request to establish a voice, text, and/or video call with the UE 106. In such examples, the UE 102 can be associated with an account on the 5G network 108, a pre-paid device, or a mobile virtual network operator (MVNO), just to name a few. The message 112 (or a portion thereof) can be sent over the 5G core network 108 for processing by a telephony application server (TAS) 114 (or other application server configured to process voice, text, and/or video calls such as an internet protocol short message gateway (IPSM-GW), etc.) which can perform functionality as described herein including accessing, receiving, or identifying an identifier (e.g., a PANI) associated with the UE 102 to determine charge(s) for communicating with the UE 106 as a communication session over a unique channel.

In various examples, the 5G system 104 can initiate, establish, maintain, format, augment, manage, or otherwise determine secure exchange of text, video, and/or photos including determining whether the UE 102 undergoes fallback (e.g., EPSFB) to communicate with the UE 106. As depicted in FIG. 1, the TAS 114 comprises a charge interface 116 and an identifier interface 118, and the 5G system 104 further comprises an integrated marketing communication (IMC) 120, an online charging system (OCS) 122, enterprise mobility management (EMM) 124, and/or a charging gateway (CG) 126 (also referred to as a charging gateway function (CGF)). In various examples, the techniques described herein can include the 5G system 104 implementing one or more of the charge interface 116, the identifier interface 118, the IMC 120, the OCS 122, the EMM 124, and/or the charging gateway 126 to determine charge(s) for the UE 102 and/or the UE 106. In various examples, the OCS 122 and the CG 126 may be a system separate from the 5G system 104 that is configured to communicate with the IMS 110 to exchange data (e.g., technology change data, charge data, etc.) over a network to implement the techniques described herein. In addition of in the alternative, the IMS 110 may be a system separate from the 5G system 104 and be configured to communicate with the 5G system 104, the 5G core network 108, the 4G system 130, and/or the 4G core network 132.

To implement the techniques described herein, in various examples the 5G system 104 and/or the IMS 110 can include one or more of: an a proxy call session control function (PCSCF), an interrogating call session control function (ICSCF), a serving call session control function (SCSCF), a serving gateway (SGW), a packet data network gateway (PGW), a policy and charging rules function (PCRF), and an internet protocol short message gateway (IPSM-GW), a short message service center (SMSC), and an evolved packet data gateway (ePDG) 328, and a Home Subscriber Server (HSS), just to name a few. In addition, the techniques described herein may be implemented using Real-Time Protocol (RTP) and/or Real-Time Control Protocol (RTCP), among others.

As mentioned, the 5G system 104 can process the message 112 and provide communication to the UE 106 during EPSFB 128 in which a 4G system (LTE) 130 employs a 4G core network 132 to communicate a fallback message 134 to the UE 106. Additionally or alternatively, the 5G system 104 can process the message 112 and provide (e.g., initiate, establish, and/or maintain) the communication associated with the message 112 to the UE 106 as a 5G message 136. In some examples, a communication session between the UE 102 and the UE 106 can include one or more instances of the fallback message 134 and the 5G message 136, and the IMS 110 (via the TAS 114) can generate data indicating the one or more instance of fallback, and communicate the data to a charging system such as the OCS 122 and/or the CG 126 to determine charges for each instance associated with each message type (e.g., charge(s) for the 5G message(s) on the 5G core network 108 and charge(s) for the fallback message(s) on the 4G core network 132).

The UE 102 and the UE 106 represent any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. An example architecture for the UE 102 and UE 106 is illustrated in greater detail in FIG. 7.

In various examples, the 5G system 104 can represent functionality to provide communications between the UE 102 and the UE 106, and can include one or more radio access networks (RANs), as well as one or more core networks linked to the RANs. For instance, a UE 102 can wirelessly connect to a base station or other access point of a RAN, and in turn be connected to the 5G core network 108. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, third generation (3G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi technology, and/or any other previous or future generation of radio access technology. In this way, the 5G system 104 is compatible to operate with other radio technologies including those of other service providers. Accordingly, the message 112 from the UE 102 may originate with another service provider (e.g., a third-party) and be processed by the TAS 114 independent of the technolog(ies) or core network associated with the service provider.

Generally, the charge interface 116 provides functionality to generate data indicating a change in technology, technologies used for communication, and/or call detail record(s) (CDR) that may be associated with one or more charges corresponding to online charges and offline charges associated with the communication (e.g., the message 112, the fallback message 134, and/or the 5G message 136) between the UE 102 and the UE 106. For instance, the charge interface 116 can generate a CDR that includes an amount of time the communication is associated with each technology type. In some examples, the OCS 122 and/or the CG 126 can determine charges based at least in part on the CDR(s) by implementing one or more diameter based interfaces such as an online charging (Ro) interface (not shown) and/or an offline charging (Rf) interface (not shown) that implement various policies and controls to determine charges for respective network types used during the communication. In various examples, the OCS 122 and/or the CG 126 (or other mediation system) can include logic to combine and/or generate charges from the one or more network types.

The identifier interface 118 can, in some examples, provides functionality to access, receive, store, or otherwise determine an identifier associated with one or more UEs (e.g., the UE 102 and/or the UE 106). In some examples, the identifier interface 118 can identify P-Access-Network-Information (PANI) (or other SIP header(s)) that identifies a technology type used by the UE 102 in association with the message 112, the fallback message 134, and/or the 5G message 136. In this way, the identifier interface 118 can determine that the message 112 is associated with a first PANI that identifies the technology type as the 5G system 104 and that the fallback message 134 is associated with a second PANI that identifies the technology type as the 4G system 130. In such examples, the identifier interface 118 can store the first PANI, and determine, based on comparing the first PANI and the second PANI, that a change in PANI has occurred (e.g., due to EPSFB 128). In such examples, the charge interface 116 can initiate a charge for each message type based at least in part on the comparison of the first PANI and the second PANI by the identifier interface 118.

As mentioned, the TAS 114 can employ or otherwise be associated with one or more of: the IMC 120, the OCS 122, the EMM 124, and/or the CG 126 to determine charge(s) for the UE 102. For instance, the IMC 120 can provide functionality to enable, because of the EPSFB 128 to the 4G system 130, the OCS 122 to determine online charging for instance when the UE 102 is associated with a pre-paid device and/or an MVNO. The EMM 124 and/or the charging gateway 126 can, for example, manage and/or store data associated with the communication (e.g., CDR file(s)) usable to determine charges (e.g., by parsing the CDR file(s)) such as a duration of the call, a type of technology used, a type of network used, and so on. Addition discussion of the IMC 120, the OCS 122, and/or the CG 126 can be found throughout this disclosure including in FIGS. 3 and 4.

In some examples, the 5G core network 108 can represent a service-based architecture that includes multiple types of network functions that process control plane data and/or user plane data to implement services for the UE 102. In some examples, the services comprise rich communication services (RCS), a VoNR service, a ViNR service, and the like which may include a text, a data file transfer, an image, a video, or a combination thereof. The network functions of the 5G core network 108 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 2, and elsewhere.

Figure 2:
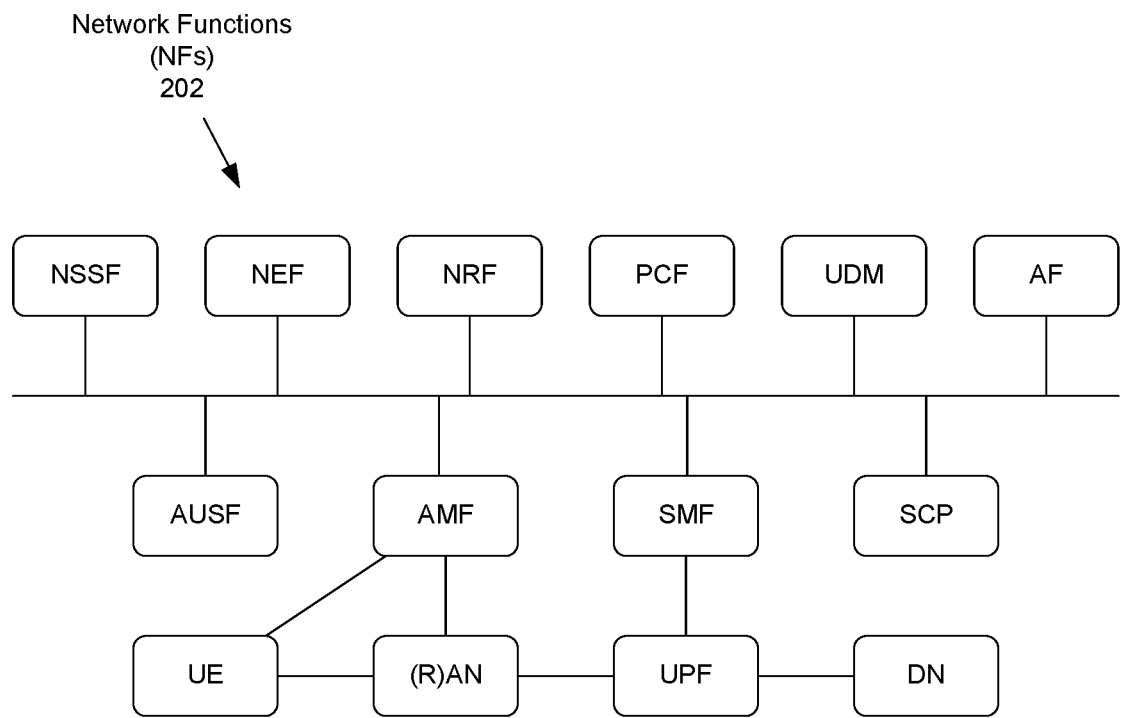
FIG. 2 depicts an example system architecture for a fifth generation (5G) telecommunication network.

FIG. 2 depicts an example system architecture for a fifth generation (5G) telecommunication network. In some examples, the telecommunication network can comprise the 5G core network 108 in FIG. 1 that includes a service-based system architecture in which different types of network functions (NFs) 202 operate alone and/or together to implement services. Standards for 5G communications define many types of NFs 202 that can be present in 5G telecommunication networks (e.g., the 5G core network 108), including but not limited to an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

One or more of the NFs 202 of the 5G network 108 can be implemented as network applications that execute within containers (not shown). 5G NFs 202 can execute as hardware elements, software elements, and/or combinations of the two within telecommunication network(s), and accordingly many types of 5G NFs 202 can be implemented as software and/or as virtualized functions that execute on cloud servers or other computing devices. Network applications that can execute within containers can also include any other type of network function, application, entity, module, element, or node.

The 5G core network 108 can, in some examples, determine a connection between an Internet Protocol (IP) Multimedia Subsystem (IMS) that manages a communication session for the UE 102, including sessions for short messaging, voice calls, video calls, and/or other types of communications. For example, the UE 102 and the IMS 110 can exchange Session Initiation Protocol (SIP) messages to set up and manage individual communication sessions. In some examples, the IMS 110 can generate a CDR to indicate changes in an identifier (e.g., a PANI) between NR, LTE, and/or Universal Mobile Telecommunications System (UMTS).

Figure 3:
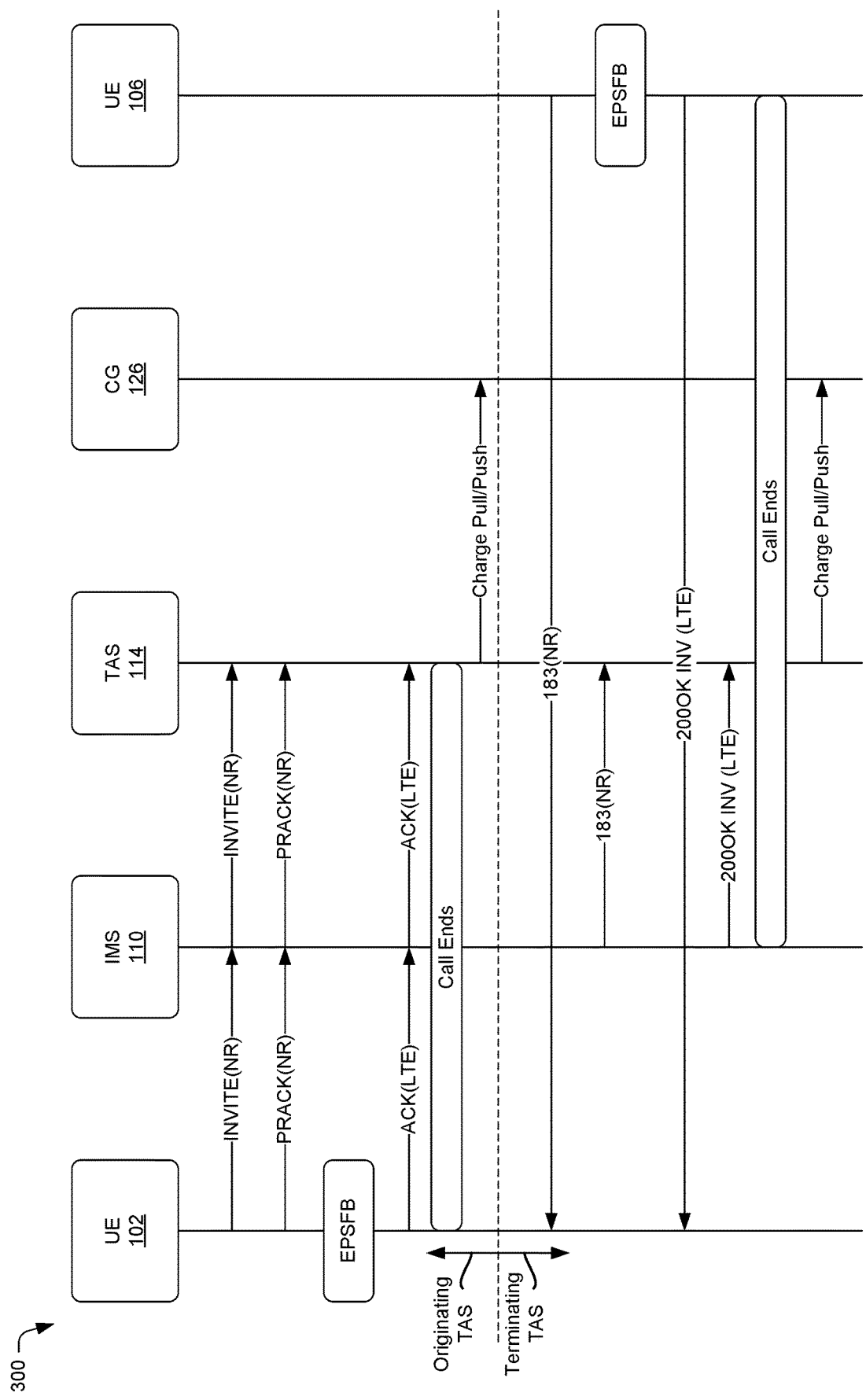
FIG. 3 depicts an example Telephony Application Server (TAS) implementing techniques to cause the determination of charges during Evolved Packet System Fallback (EPSFB) for an example user equipment (UE).

FIG. 3 depicts an example Telephony Application Server (e.g., the TAS 114) determining changes in technology usable for generating charges during Evolved Packet System Fallback (e.g., the EPSFB 128) for an example user equipment (e.g., the UE 102 and/or the UE 106). For example, the UE 102 may send the message 112 to the 5G core network 108 which can cause the fallback message 134 to be sent to the UE 106. Though the TAS 114, the IMC 120, and the CG 126 are illustrated in FIG. 3 individually, it is understood that the TAS 114, the IMC 120, and/or the CG 126 (of functionality provided therefrom) may be directly coupled to and/or integrated into the IMS 110 or other sub-system of the 5G system 104. However, in other examples functionality provided by the TAS 114 may be implemented as a system separate from the IMS 110 (e.g., to provide services to other network architectures and/or other network operators).

In some examples, a messaging flow as shown in FIG. 3 can represent activity to determine conditions by the TAS 114 during the establishing and maintaining of a communication (e.g., the message 112, the fallback message 134, and/or the 5G message 136) between the UE 102 and the UE 106. The TAS 114 can generate data representing the conditions for sending to a charging system, such as the charging gateway 126. For example, a UE 102 can send an INVITE(NR) message to the IMS 110 to initiate a call to the UE 106. The IMS 110 can forward the INVITE(NR) message to the TAS 114. In some examples, the UE 102 can send a provisional response acknowledgement PRACK(NR) message to the IMS 110 which can forward the PRACK (NR) to the TAS 114. As illustrated in FIG. 3, the UE 102 can undergo EPSFB (e.g., EPSFB 128) and send an acknowledgement ACK(LTE) to the IMS 110 which can forward the ACK(LTE) to the TAS 114 to indicate a change of network. In various example, the message sent to the TAS 114 can include an identifier indicating a technology type of the network, such as a PANI associated with the 5G network and a PANI associated with the LTE network.

In some examples, the UE 102 can communicate with the UE 106 over the 5G network and/or the 4G network, and the TAS 114 can cause the determination of charge(s) for the UE 102 during the communication in real-time. After the call ends, the TAS 114 can exchange charge information (e.g., shown as charge push/pull in FIG. 3) about the one or more charges with the CG 126. The TAS 114 and/or the CG 126 can determine call detail records based at least in part on logic (e.g., a mathematical algorithm, a machine learned algorithm, and the like) that combines or aggregates the charges. In such examples, the TAS 114 can act as an originating TAS by receiving an invite from the UE 102.

FIG. 3 also depicts the TAS 114 acting as a terminating TAS (e.g., facilitating termination of the UE 106 to another component or UE). For instance, the UE 106 can send a session progress 183(NR) message to the UE 102 which causes the 183(NR) message to be sent from the IMS 110 to the TAS 114. As illustrated in FIG. 3, the UE 106 can undergo EPSFB (e.g., EPSFB 128) and send an invite 200OK INV(LTE) to the UE 102 which causes the IMS 110 to forward the 200OK INV(LTE) to the TAS 114 to indicate a change of network (e.g., a change in PANI indicating that the UE 106 has joined an LTE network as a result of the UE 106 experiencing fallback). After the call ends between the UE 106 and the UE 102, the TAS 114 can exchange charge information (e.g., shown as charge push/pull in FIG. 3) about the one or more charges with the CG 126.

Figure 4:
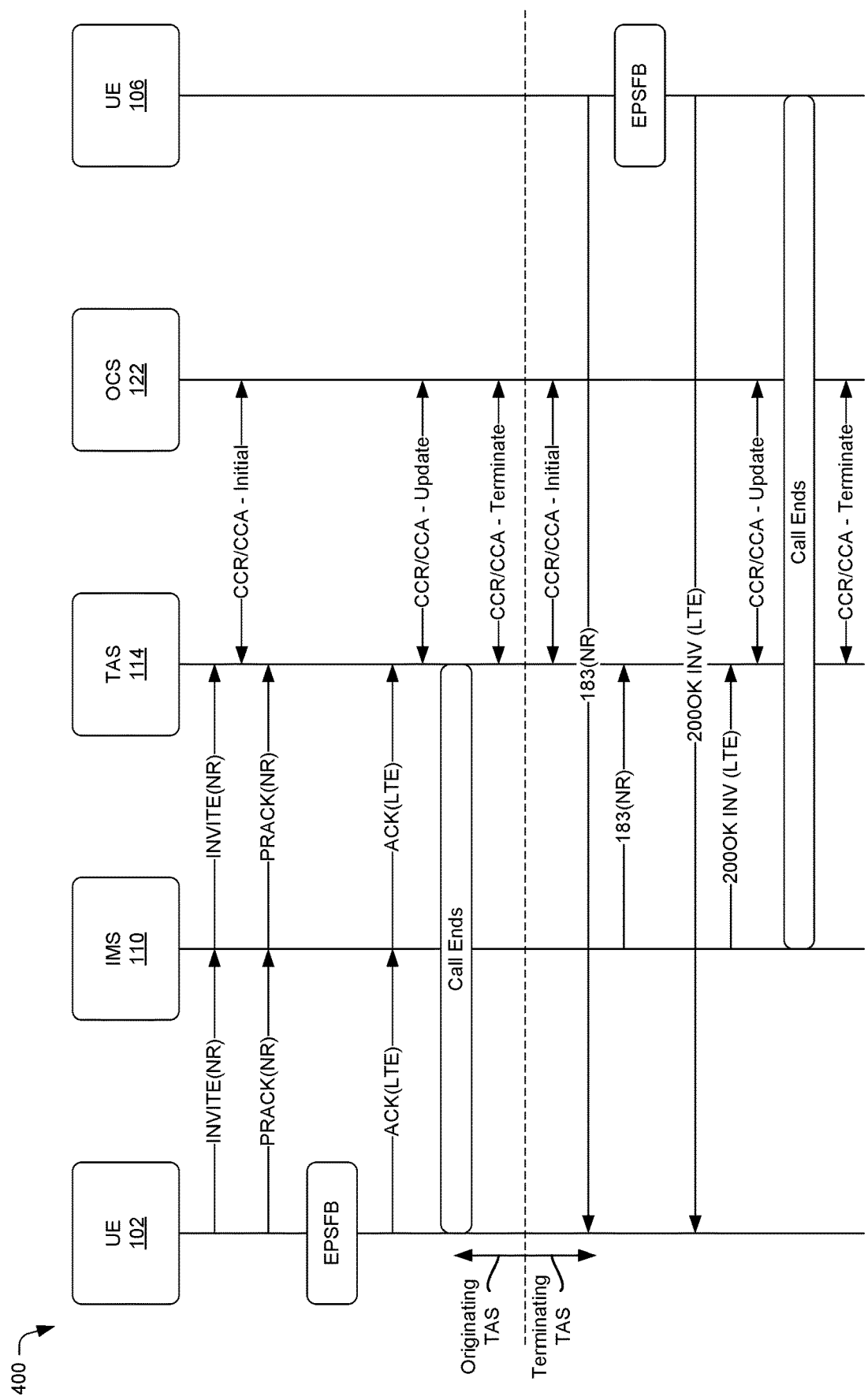
FIG. 4 depicts an example Telephony Application Server (TAS) implementing techniques to cause the determination of online charges during Evolved Packet System Fallback (EPSFB) for an example user equipment (UE) associated with a pre-paid account.

FIG. 4 depicts an example Telephony Application Server (e.g., the TAS 114) determining changes in technology usable for generating online charges during Evolved Packet System Fallback (EPSFB) (e.g., the EPSFB 128) for an example user equipment (e.g., the UE 102 and/or the UE 106) associated with a pre-paid account. For example, the UE 102 may send the message 112 to the 5G core network 108 which can cause the fallback message 134 to be sent to the UE 106. In other examples, the UE 106 can generate a fallback message that causes the UE 102 to use the 4G core network 132. In various examples, the UE 102 and/or the UE 106 can be associated with a pre-paid account such as a mobile virtual network operator (MVNO).

Though the TAS 114, the IMS 110, and the OCS 122 are illustrated in FIG. 4 individually, it is understood that the TAS 114, the IMS 110, and/or the OCS 122 (of functionality provided therefrom) may be directly coupled to and/or integrated into the IMS 110 or other sub-system of the 5G system 104. Further, in some examples functionality provided by the IMS 110 and/or the TAS 114 may be implemented as a system separate to provide services to other network architectures and/or other network operators.

In some examples, a messaging flow as shown in FIG. 4 can represent activity to determine charges by the TAS 114 during the establishing and maintaining of a communication (e.g., the message 112 and/or the fallback message 134) between the UE 102 and the UE 106 in which the UE 102 comprises a pre-paid account. For example, the UE 102 can send an INVITE(NR) message to the IMS 110 to initiate a call to the UE 106. The IMS 110 can forward the INVITE (NR) message to the TAS 114. Upon receiving the INVITE (NR) message, the TAS 114 can send a credit control request (CCR) and a credit control answer (CCA) initial message to the OCS 122. In such examples, the OCS 122 can send information related to the CCR/CCA message to the TAS 114 indicating credit related to the pre-paid account of the UE 102 (e.g., an amount of available credit, past consumption, as the like). For instance, the OCS 122 can provide an indication of whether the UE 102 has sufficient credit to initiate a VoNR call via the 5G core network 108.

In some examples, the UE 102 can send a PRACK(NR) message to the IMS 110 which can forward the PRACK (NR) to the TAS 114. As illustrated in FIG. 4, the UE 102 can undergo EPSFB (e.g., EPSFB 128) and send an acknowledgement ACK(LTE) to the IMS 110 which can forward the ACK(LTE) to the TAS 114 to indicate a change of network. In various example, the message sent to the TAS 114 can include an identifier indicating a technology type of the network, such as a PANI associated with the 5G network and a PANI associated with the LTE network.

Upon receiving the ACK(LTE), the TAS 114 can send a CCR-CCA update message to the OCS 122 based at least in part on the TAS 114 identifying a change in type of technology (e.g., identifying a change in the PANI of the UE 102 indicating the EPSFB 128 to the 4G core network 132).

Upon receiving the CCR-CCA update message, the OCS 122 can identify a credit associated with the 4G core network 132 and exchange information thereof with the TAS 114. In this way, the TAS 114 can notify the UE 102 of the credit, and in some examples, enable communication to the UE 106 over the 4G core network 132, including instances when the UE 102 did not have sufficient credit to place a VoNR communication. Accordingly, the TAS 114 can provide functionality to connect the UE 102 and the UE 106 in examples that would otherwise be denied based at least in part on the UE 102 not having credit to place the VoNR communication.

In some examples, the UE 102 can communicate with the UE 106 over the 5G network and/or the 4G network, and the TAS 114 can initiate, access, generate, or otherwise determine data usable by a charging system (the OCS 122) that determines charge(s) for the UE 102 during the communication in real-time. After the call ends, the TAS 114 can exchange charge information (e.g., shown as a CCR/CCA terminate message in FIG. 4) about the one or more charges to the OCS 122. The TAS 114 and/or the OCS 122 can determine call detail records based at least in part on logic that combines or aggregates the charges. In such examples, the TAS 114 can act as an originating TAS by receiving an invite from the UE 102.

FIG. 4 also depicts the TAS 114 acting as a terminating TAS (e.g., facilitating termination of the UE 106 to another component or UE). In some examples, a CCR/CCA initial message can be exchanged between the TAS 114 and the OCS 122 to establish credit associated with a call originating by the UE 106. Subsequently, the UE 106 can send a session progress 183(NR) message to the UE 102 which causes the 183(NR) message to be sent from the IMS 110 to the TAS 114. As illustrated in FIG. 4, the UE 106 can undergo EPSFB (e.g., EPSFB 128) and send an invite 200OK INV(LTE) to the UE 102 which causes the IMS 110 to forward the 200OK INV(LTE) to the TAS 114 to indicate a change of network (e.g., a change in PANI indicating that the UE 106 has joined an LTE network as a result of the UE 106 experiencing fallback).

Upon receiving the 200OK INV(LTE), the TAS 114 can send a CCR-CCA update message to the OCS 122 to initiate and identify a credit associated with the 4G core network 132 for the UE 106. The OCS 122 can exchange credit information with the TAS 114 and/or determine charges for the UE 106 and/or the UE 102 associated with voice, video, text, and other types of communication. In various examples, the OCS 122 can determine whether sufficient credit of a pre-paid account exists for communication between the UE 102 and the UE 106 regardless of the type of communication (e.g., online, offline, voice, video, and the like). In some examples, the OCS 122 can indicate an amount of credit (minutes or other time period) to the TAS 114 allowable for a given communication session and communicate an indication to the TAS 114 when the minutes are consumed. In examples when the OCS 122 determines that the UE 102 and/or the UE 106 does not have sufficient credit for a communication session (based on rating logic for the communication session), the OCS 122 can provide an indication of additional credit to enable a communication session to continue (such as when the credit becomes insufficient during the communication). In such examples, the additional credit provided by the OCS 122 can be communicated with the TAS 114 at the end of the communication. In examples when a communication ends prior to consuming the available credit, the OCS 122 can determine an amount of unused credit (e.g., unused minutes) to update future credit associated with the user account.

After the call ends between the UE 106 and the UE 102, the TAS 114 can exchange charge information (e.g., shown as a CCR/CCA terminate message of the terminating TAS in FIG. 4) about the one or more charges with the OCS 122.

Although FIGS. 3 and 4 depict a single telephony application server (e.g., the TAS 114), multiple telephony application servers (or other server types) may be implemented to perform the techniques described herein. For instance, the UE 102 may be associated with a first telephony application server and the UE 106 may be associated with a second telephony application server different from the first telephony application server. In such examples, the first telephony application server and the second telephony application server can each generate one or more CDRs for online and/or offline charging determinations for respective users of each device. For example, the first telephony application server serving or otherwise associated with the UE 102 can indicate originating service EPSFB while the second telephony application server serving the UE 106 can indicate terminating service EPSFB. In this way, the first telephony application server can generate originating call detail record(s) associated with a user making a Mobile Originating (MO) communication and the second telephony application server can generate terminating call detail record(s) associated with the user making a Mobile Terminating (MT) communication.

FIG. 5 depicts a flowchart of an example process 500 for determining charges by an example server for an example user equipment. Some or all of the process 500 may be performed by one or more components in FIGS. 1-4 and 7, as described herein. For example, some or all of process 500 may be performed by the IMS 110, the TAS 114, the IMC 120, the OCS 122, and/or the CG 126.

At operation 502, the process may include receiving, by a server of a fifth generation telecommunications network, a message from a first user equipment (UE) indicating a request for communication with a second UE. In some examples, the operation 502 may include the TAS 114 receiving a message from the UE 102 comprising a request for a VoNR communication, a ViNR communication, or other service provided by the 5G system 104. By way of example and not limitation, a UE of a fifth generation system that includes a fifth generation core network can send a message comprising text, an image, a video, and/or a file transfer to the IMS 110 (or other system) and/or the TAS 114 requesting a communication session with one or more additional UEs.

In some examples, the message from the UE 102 can comprise an identifier that indicates information about a type of technology (e.g., a 5G core network 108) that the UE 102 is using to communicate the message (e.g., the message 112). For instance, the TAS 114 can receive P-Access-Network-Information (PANI) indicating a carrier or a type of technology associated with a network, and/or receive a SIP User-Agent header indicating a type of device, a device manufacture, and other information pertaining to an origination UE and/or network. In some examples, the UE 102 can be associated with a specific carrier, a MVNO, or a pre-paid account.

At operation 504, the process may include determining, by the server and based at least in part on an identifier of the first UE indicating a type of technology associated with the message, that the communication comprises Evolved Packet System Fallback (EPSFB) from the fifth generation telecommunications network to a second network different from the fifth generation telecommunications network. For instance, the IMS 110 and/or the TAS 114 can determine that the 5G core network 108 is unable to complete the request for the communication (e.g., a VoNR communication) to the second UE using the 5G core network and therefore requires the second network (e.g., a 4G network, a 3G network, and the like) to complete the communication request. In various examples, the TAS 114 can determine that an identifier (e.g., a first PANI) associated with the fifth generation telecommunications network is different form an identifier (e.g., a second PANI) associated with the second network. The TAS 114 can also determine that fallback (EPSFB) occurred based at least in part on the difference between the first PANI and the second PANI. In some examples, the EPSFB occurs at the initiation of a call between the UE 102 and the UE 106 while in other examples, the message form the UE 102 can be received after a portion of a VoNR communication (or other communication) has already been completed using the 5G core network.

In some examples, the TAS 114 can access, receive, or otherwise determine an identifier associated with the UE 102 (and/or the UE 106) from a memory, a database, or other storage device that indicates a type of technology associated with the second network (e.g., 4G, 3G, and so on). For instance, the TAS 114 can access the identifier from the message received from the UE 102 requesting a communication with the UE 106.

In examples when a communication between the UE 102 and the UE 106 occurs over the 5G core network 108 prior to the UE 102 falling back to the second network, the TAS 114 can access (e.g., from a previous message, a memory, a database, and the like) a first identifier associated with the UE 102 indicating the communication to the 5G core network 108. In such examples, the TAS 114 can access or otherwise receive, from the same message or another message of the UE 102, a second identifier and determine, based at least in part on comparing the first and second identifiers, that a change of an identifier value occurred (e.g., a change from a first PANI value to a second PANI value). For instance, the TAS 114 can compare two PANI values and determine that the UE 102 has changed from a 5G core network to a 4G core network.

By accessing the identifier(s), the TAS 114 can cause charge(s) to be determined based at least in part on a type of technology used to communicate the message. In some instances, the identifier(s) can be saved in a database, server, or other memory resource for access at a later time. In some examples, the TAS 114 can determine changes in the identifiers based at least in part on accessing such information thereby enabling charges to be configured in substantially real-time based on which network the UE uses to communicate.

At operation 506, the process may include sending, by the server, information indicating the EPSFB to a charging system. In some examples, the operation 506 may include the TAS 114 sending data representative of the EPSFB to a charging system such as the OCS 122 and/or the CG 126. In various examples, logic employed by the charging system can determine online and/or offline charges associated with the message.

In some examples, the TAS 114 can determine account information associated with the UE (e.g., which carrier the UE 102 has an account with or whether the UE 102 is associated with a pre-paid account, and so on) based at least in part on communicating data with a Home Subscriber Server (HSS). For instance, the TAS 114 can receive or otherwise determine a user profile from the HSS indicating whether online and/or offline charges are to be applied. In some examples, information associated with the user profile may be shared or communicated between the TAS server 114 and the charging system. The TAS server 114 can, in some examples, download the user profile associated with the UE 102 and/or the UE 106 responsive to registration with the IMS 110 and/or responsive to providing unregistered service to the UE 102 and/or the UE 106 while communication is established.

At operation 508, the process may include receiving, by the server, a charge for the first UE associated with the communication to the second UE over the second network based at least in part on the information indicating the EPSFB sent to the charging system. In some examples, the operation 508 may include the TAS 114 receiving data indicating one or more charges for the UE 102 and/or the UE 106 to communicate with the second UE (e.g., the other of the UE 102 or the UE 106) over the 4G core network. In various examples, the charge(s) can comprise an online charge, and offline charge, or other charge associated with the communication. In some examples, the charge can be determined by the charge system during initiation of the communication while in other examples the charge can be determined in real-time during the communication. Further, the charge system can, in some examples, identify or generate charges during the communication for each portion completed on the 5G network and the 4G network. For example, the TAS 114 can provide an indication of EPSFB in a call detail record or other data sent to the charge system to enable the charge system to determine a rate for the UE 102 corresponding to each technology used when the UE 102 is associated with an MVNO.

Figure 6:
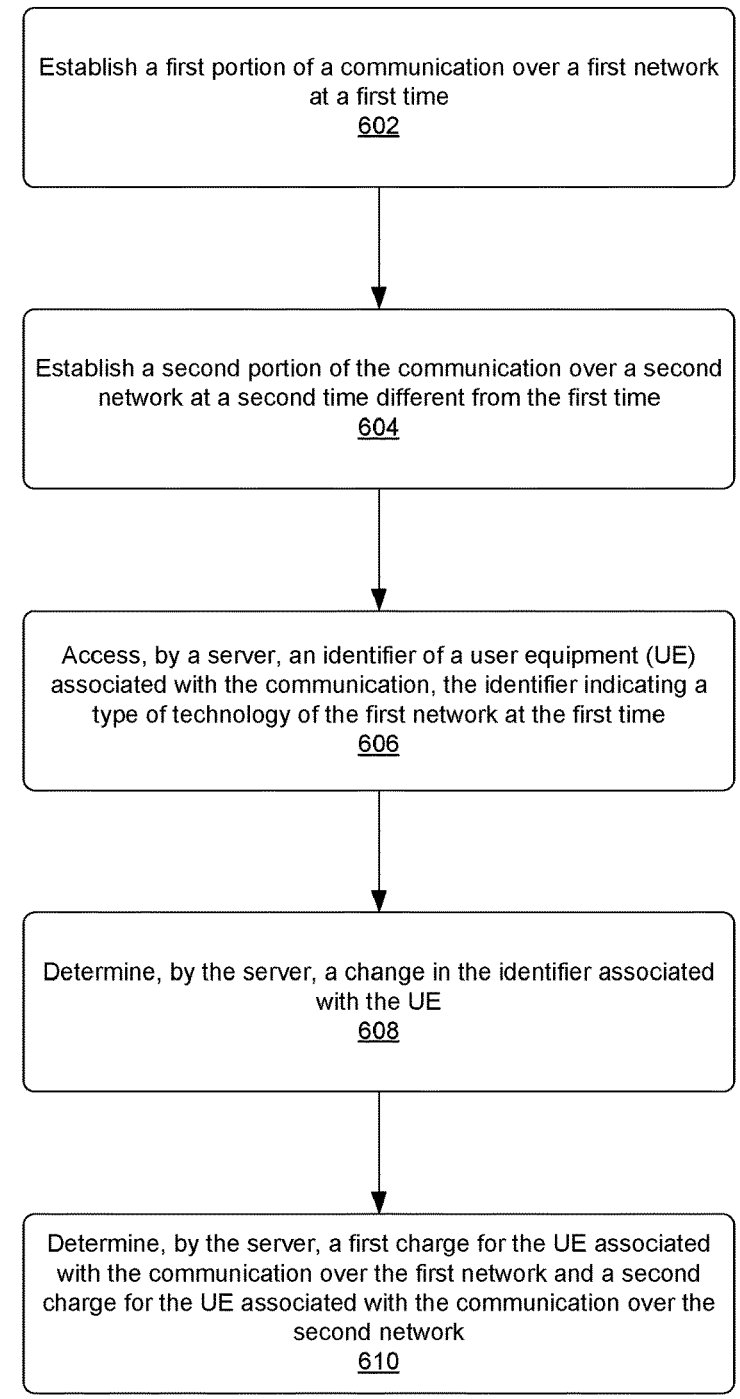
FIG. 6 depicts another flowchart of an example process for determining charges by an example server for an example user equipment.

FIG. 6 depicts a flowchart of an example process 600 for determining charges by an example server for an example user equipment. Some or all of the process 600 may be performed by one or more components in FIGS. 1-4 and 7, as described herein. For example, some or all of process 600 may be performed by the IMS 110, the TAS 114, the IMC 120, the OCS 122, and/or the CG 126.

At operation 602, the process may include establishing a first portion of a communication over a first network at a first time. In some examples, the operation 602 may include a communication between two or more UEs over a 5G network, a 4G network, a 3G network, or the like. An identifier (e.g., a PANI) associated with one or more of the UEs in the communication can be sent by the first network to the TAS 114. In various examples, the first portion of the communication can represent part of a call taking place or completed on the first network. In some examples, the communication can be established based at least in part on receiving a message from a UE (e.g., the UE 102) comprising a request for a VoNR communication, a ViNR communication, or other service provided by the first network. In some examples, a UE associated with the communication can include a MVNO or a pre-paid account.

At operation 604, the process may include establishing a second portion of the communication over a second network at a second time different from the first time. In some examples, the operation 604 may include a different network from the first network establishing another portion of the communication, such as a portion of a call. For instance, the communication may start as the first portion on a 5G network and switch to a 4G network as part of a fallback operation (e.g., EPSFB) during the second portion (or vice versa). An identifier (e.g., a PANI) associated with one or more of the UEs in the communication can be sent by the second network to the TAS 114 to indicate a type of network used during the second portion of the communication. In various examples, the second portion of the communication can represent part of a call taking place or completed on the second network. In some examples, the communication can be established on the second network to maintain voice, text, and/or video communications initiated on the first network.

At operation 606, the process may include accessing, by a server, an identifier of a user equipment (UE) associated with the communication, the identifier indicating a type of technology of the first network at the first time. In some examples, the operation 606 may include the TAS 114 receiving or accessing the identifier associated with the UE 102 that indicates a type of technology associated with the first network (e.g., 5G, 4G, 3G, and so on) from a message of the communication, a memory, or a database associated with the TAS 114. The TAS 114 can access the identifier, for example, from the message received from the UE 102. In some examples, the identifier can indicate information about a type of technology (e.g., a 5G core network 108, a 4G core network 132, and so on) used for the communication over the first network. For instance, the TAS 114 can receive P-Access-Network-Information (PANI) indicating a carrier or a type of technology associated with a network, and/or receive a SIP User-Agent header indicating a type of device, a device manufacture, and other information pertaining to an origination UE and/or network At operation 608, the process may include determining, by the server, a change in the identifier associated with the UE. In examples when a communication between the UE 102 and the UE 106 occurs over the first network (e.g., the 5G core network 108) and the UE 102 falls back to the second network, the TAS 114 can access (e.g., from memory, a database, a message, and the like) a second identifier associated with the UE 102 indicating the communication from the 5G core network 108 to the second network. In such examples, the TAS 114 can access or otherwise receive, from another message of the UE 102, memory, and so on, the second identifier and determine, based at least in part on comparing the first and second identifiers, that a change of an identifier value occurred (e.g., a difference between a first PANI value and a second PANI value). For instance, the TAS 114 can compare two PANI values and determine that the UE 102 has changed from a 5G core network to a 4G core network (or vice versa). In some examples, the TAS 114 can indicate an account type associated with the UE (e.g., which carrier the UE 102 has an account with, or whether the UE 102 is associated with a pre-paid account, just to name a few). For instance, the TAS 114 can receive or otherwise determine a user profile from the HSS indicating whether online and/or offline charges are to be applied. In some examples, information associated with the user profile may be shared or communicated between the TAS server 114 and the charging system (e.g., the OCS 122 and/or the CG 126).

At operation 610, the process may include determining, by the server, a first charge for the UE associated with the communication over the first network and a second charge for the UE associated with the communication over the second network. In some examples, the operation 608 may include the IMS 110 and/or the TAS 114 receiving determinations of charges from the charging system for the UE 102 to communicate with the second UE over the 5G core network 108 and the 4G core network 132. In various examples, the first charge and/or the second charge can comprise an online charge, and offline charge, or other charge associated with the communication. In some examples, the first charge and/or the second charge can be determined by the charging system during the communication over the first network and the second network in substantially real-time, and communicated to the TAS 114. In this way, the TAS 114 can, in some examples, identify and send an indication of EPSFB (based on a change in the PANI) to a charging system for generating charges or rates during the communication for the first portion on the first network and the second portion on the 4G network. In some examples, information such as a call detail record, an indication of EPSFB, user profile, or other information determined by the TAS 114, can be used to determine a specific UE type which performs EPSFB more often relative to other US types. In some examples, the information associated with or stored by the TAS 114 can be sent to a server, computing device, machine learned model, and the like, to improve design of the 5G core network relative to new radio services such as VoNR, ViNR, RCS services, and the like.

In various examples, information about the call detail record, the first charge and/or the second charge can be sent from the TAS 114 to other components of the first network or the second network that enable network parameters to be determined that improve functioning of the first network and/or the second network (versus not sending the information). For example, the TAS sever 114 can share information with other components of other networks that is usable to avoid future communications from experiencing fallback (e.g., EPSFB 128). In some examples, the network parameters can be determine by a machine learned model to provide peak throughput, and can include one or more of: a bandwidth, a Time Division Duplex (TDD) ratio configuration, a frequency, a transmission power, or a beamforming Precoding Matrix Indicator (PMI), a location, a signal strength, or a signal-to-noise ratio, just to name a few. In various examples, the network parameters are usable to transmit data between the one or more UEs, including improving design and operation of VoNR communications over the network with optimal efficiency and accuracy. For instance, a computing device (or human operator thereof) can analyze the instances of fallback to identify a location, a base station, a design parameter, or other cause of the fallback to reduce as amount of fallback that occurs in the future. In various examples, the techniques described herein can be used to implement changes in the way a network is designed, such as when new services are being deployed. In this way, locations, base stations (or other network elements), and other design parameters can be adjusted, modified, or added to increase an amount of devices that can utilize the new services.

Figure 7:
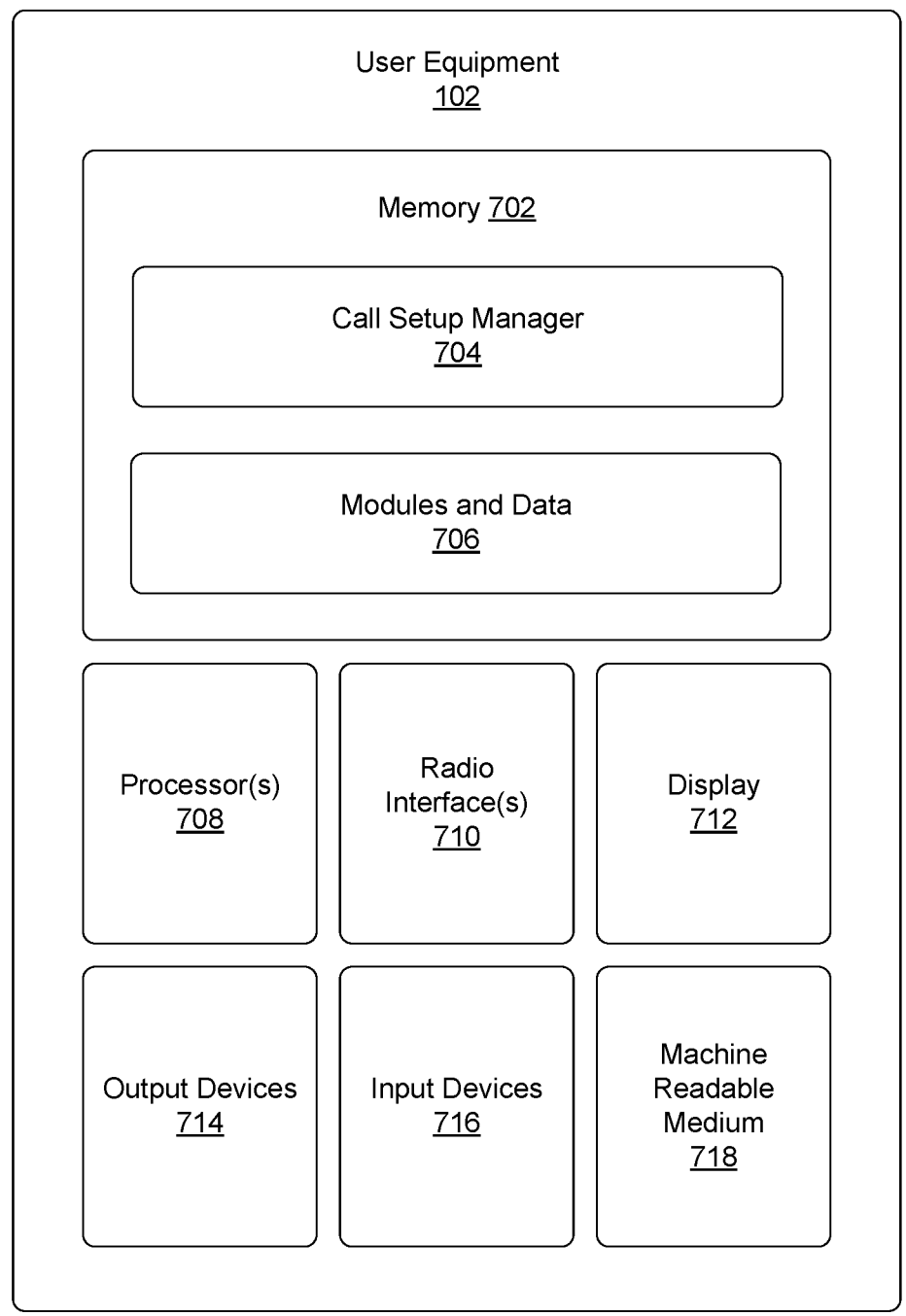
FIG. 7 depicts an example system architecture for a user equipment.

FIG. 7 depicts an example system architecture for a UE 102, in accordance with various examples. As shown, a UE 102 can have memory 702 storing a call setup manager 704, and other modules and data 706. A UE 102 can also comprise processor(s) 708, radio interfaces 710, a display 712, output devices 714, input devices 716, and/or a machine readable medium 718.

In various examples, the memory 702 can include system memory, which may be volatile (such as RAM), non-volatile (such as ROM, flash memory, etc.) or some combination of the two. The memory 702 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 102. Any such non-transitory computer-readable media may be part of the UE 102.

The call setup manager 704 can send and/or receive messages comprising a VoNR service, a ViNR service, and/or an RCS service including SIP messages associated with setup and management of a call session via the IMS. The SIP messages can include any of the SIP messages shown in FIG. 5, and/or other SIP messages.

The other modules and data 706 can be utilized by the UE 102 to perform or enable performing any action taken by the UE 102. The modules and data 706 can include a UE platform, operating system, and applications, and data utilized by the platform, operating system, and applications.

In various examples, the processor(s) 708 can be a central processing unit (CPU), a graphics processing unit (GPU), or both CPU and GPU, or any other type of processing unit. Each of the one or more processor(s) 708 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 708 may also be responsible for executing all computer applications stored in the memory 702, which can be associated with common types of volatile (RAM) and/or nonvolatile (ROM) memory.

The radio interfaces 710 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 710 can be compatible with multiple radio access technologies, such as 5G radio access technologies and 4G/LTE radio access technologies. Accordingly, the radio interfaces 710 can allow the UE 102 to connect to the 5G system 104 described herein.

The display 712 can be a liquid crystal display or any other type of display commonly used in UEs. For example, display 712 may be a touch-sensitive display screen, and can then also act as an input device or keypad, such as for providing a soft-key keyboard, navigation buttons, or any other type of input. The output devices 714 can include any sort of output devices known in the art, such as the display 712, speakers, a vibrating mechanism, and/or a tactile feedback mechanism. Output devices 714 can also include ports for one or more peripheral devices, such as headphones, peripheral speakers, and/or a peripheral display. The input devices 716 can include any sort of input devices known in the art. For example, input devices 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 718 can store one or more sets of instructions, such as software or firmware, that embodies any one or more of the methodologies or functions described herein. The instructions can also reside, completely or at least partially, within the memory 702, processor(s) 708, and/or radio interface(s) 710 during execution thereof by the UE 102. The memory 702 and the processor(s) 708 also can constitute machine readable media 718.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein. For instance, techniques described in FIGS. 5 and 6 can be combined in various ways.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving, by a server of a fifth generation telecommunications network, a message from a first user equipment (UE) indicating a request for communication with a second UE;
determining, by the server and based at least in part on an identifier of the first UE indicating a type of technology associated with the message, that the communication comprises Evolved Packet System Fallback (EPSFB) from the fifth generation telecommunications network to a second network different from the fifth generation telecommunications network;
sending, by the server, information indicating the EPSFB to a charging system; and
receiving, by the server, a charge for the first UE associated with the communication to the second UE over the second network based at least in part on the information indicating the EPSFB sent to the charging system.

2. The method of claim 1, wherein:
the second network comprises a fourth generation telecommunications network; and
the message from the first UE indicates a request for a Voice over New Radio (VoNR) communication.

3. The method of claim 2, wherein the charge is a first charge and the type of technology is a first type of technology, and further comprising:
receiving, by the server and from the charging system, a second charge based at least in part on a change in the identifier associated with the first UE identifying a second type of technology of the fifth generation telecommunications network; and
generating charge detail records based at least in part on the first charge and the second charge.

4. The method of claim 3, wherein the change in the identifier comprises a change in first P-Access-Network-Information associated with the fifth generation telecommunications network and second P-Access-Network-Information associated with the fourth generation telecommunications network.

5. The method of claim 1, wherein the message from the first UE indicates a request for a Voice over New Radio (VoNR) communication, the charge is a first charge, and further comprising:
establishing the communication over the second network at a first time;
establishing the communication over the fifth generation telecommunications network at a second time different from the first time;
determining a second charge based at least in part on establishing the communication over the fifth generation telecommunications network;
combining the first charge and the second charge; and
determining call detail records for the first UE based at least in part on combining the first charge and the second charge.

6. The method of claim 5, further comprising:
determining a first period of time associated with the communication over the second network;
determining a second period of time associated with the communication over the fifth generation telecommunications network; and
determining the call detail records for the first UE further based at least in part on the first period of time and the second period of time.

7. The method of claim 1, further comprising:
determining that the charge is associated with the EPSFB from the fifth generation telecommunications network to the second network; and
based at least in part on the determining that the charge is associated with the EPSFB, determining network parameters associated with peak throughput for the first UE or the second UE over the fifth generation telecommunications network.

8. The method of claim 1, wherein:
the charge for the first UE comprises at least one of: charge detail records, an online charge, or an offline charge.

9. The method of claim 1, wherein:
the identifier comprises P-Access-Network-Information;
the server comprises a Telephony Application Server (TAS) associated with an Internet Protocol (IP) Multimedia Subsystem (IMS); and
the TAS is associated with a charge detail records interface, an online charging (Ro) interface, or an offline charging (Rf) interface.

10. A system comprising:
one or more processors; and
memory storing computer-executable instructions that, when executed by the one or more processors, cause the system to perform operations comprising:
receiving, by a fifth generation telecommunications network, a message from a first user equipment (UE) indicating a request for communication over using the fifth generation telecommunications network;
determining that the communication comprises Evolved Packet System Fallback (EPSFB) from the fifth generation telecommunications network to a second network different from the fifth generation telecommunications network; and
determining a charge associated with the first UE based at least in part on an identifier associated with the UE identifying a type of technology of the second network.

11. The system of claim 10, wherein:
the second network comprises a fourth generation telecommunications network; and
the message from the first UE indicates a request for a Voice over New Radio (VoNR) communication.

12. The system of claim 10, the operations further comprising:
determining a second charge based at least in part on a change in the identifier associated with the first UE identifying a second type of technology of the fifth generation telecommunications network; and
generating charge detail records based at least in part on the first charge and the second charge.

13. The system of claim 10, wherein the identifier comprises P-Access-Network-Information.

14. The system of claim 10, wherein the message from the first UE indicates a request for a Voice over New Radio (VoNR) communication, the charge is a first charge, and the operations further comprising:
establishing the communication over the second network at a first time;
establishing the communication over the fifth generation telecommunications network at a second time different from the first time;

determining a second charge based at least in part on establishing the communication over the fifth generation telecommunications network;

combining the first charge and the second charge; and determining call detail records for the first UE based at least in part on the combining.

\* \* \* \* \*